O. E. P. FRANZ.
VEHICLE FOLDABLE TOP.
APPLICATION FILED JAN. 10, 1917.

1,269,592.

Patented June 18, 1918.
3 SHEETS—SHEET 2.

WITNESSES

INVENTOR
O. E. P. Franz
BY
ATTORNEYS

O. E. P. FRANZ.
VEHICLE FOLDABLE TOP.
APPLICATION FILED JAN. 10, 1917.

1,269,592.

Patented June 18, 1918.
3 SHEETS—SHEET 3.

WITNESSES

INVENTOR
O.E.P. Franz
BY
ATTORNEYS

UNITED STATES PATENT OFFICE.

OTTO E. P. FRANZ, OF NEW YORK, N. Y.

VEHICLE FOLDABLE TOP.

1,269,592.

Specification of Letters Patent.

Patented June 18, 1918.

Application filed January 10, 1917. Serial No. 141,576.

*To all whom it may concern:*

Be it known that I, OTTO E. P. FRANZ, a subject of the Emperor of Germany, and a resident of the city of New York, Elmhurst, borough of Queens, in the county of Queens and State of New York, have invented a new and Improved Vehicle Foldable Top, of which the following is a full, clear, and exact description.

My invention relates to foldable tops for vehicles, and it has reference more particularly to tops for cars known as "closed or winter cars."

An object of the invention is to provide a foldable top whereby the rear part of a closed car can be easily and quickly collapsed to transform the car into a semi-open car or a totally-open car, as the case may be, depending on the construction of the car.

Another object of the invention is to provide a folding top which will collapse in a manner not to deform the general appearance of the car.

A still further object of the invention is to provide a foldable top which can be collapsed from within the car by a mechanism operated manually or from the motive power of the vehicle.

With the above and other objects in view, the nature of which will more fully appear as the description proceeds, the invention consists in the novel construction, combination, and arrangement of parts as herein fully described, illustrated and claimed.

In the accompanying drawings, forming part of the application, similar characters of reference indicate corresponding parts in all the views.

Figure 1:
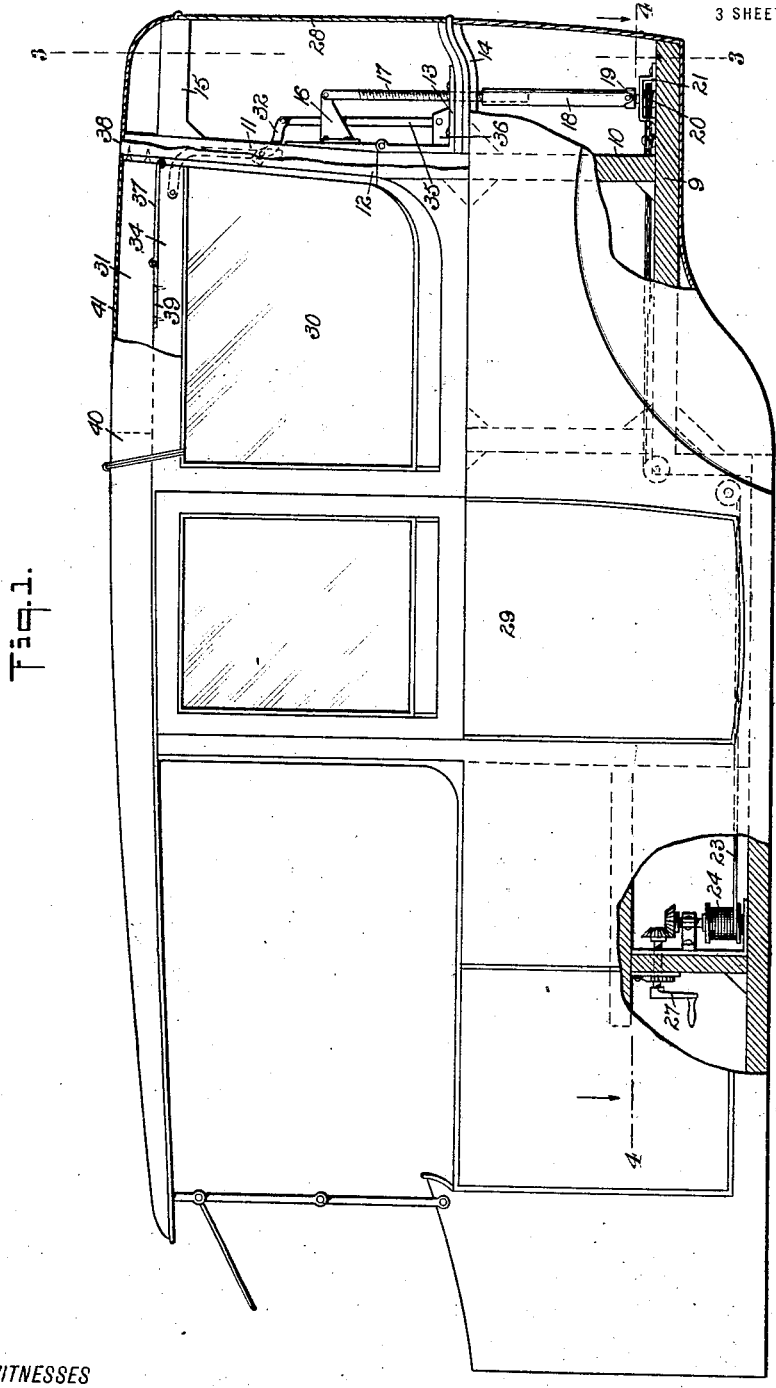
Figure 1 is a side elevation of a car body provided with my invention certain portions of which are broken out to show the details of construction.

Referring to the drawings, 9 is the bed of the vehicle frame which carries up-rights 10 to which a bow 11 is secured by hinges 12 to fold rearwardly. Each hinge has a plate 13 whereby it may also be secured to the central rear brace 14 which unites the up-rights 10. The bow 11 is reinforced by a rearwardly-directed brace 15 near the top thereof which has substantially the shape of the brace 14 corresponding to the desired shape the vehicle is to have at the rear.

Figure 4:
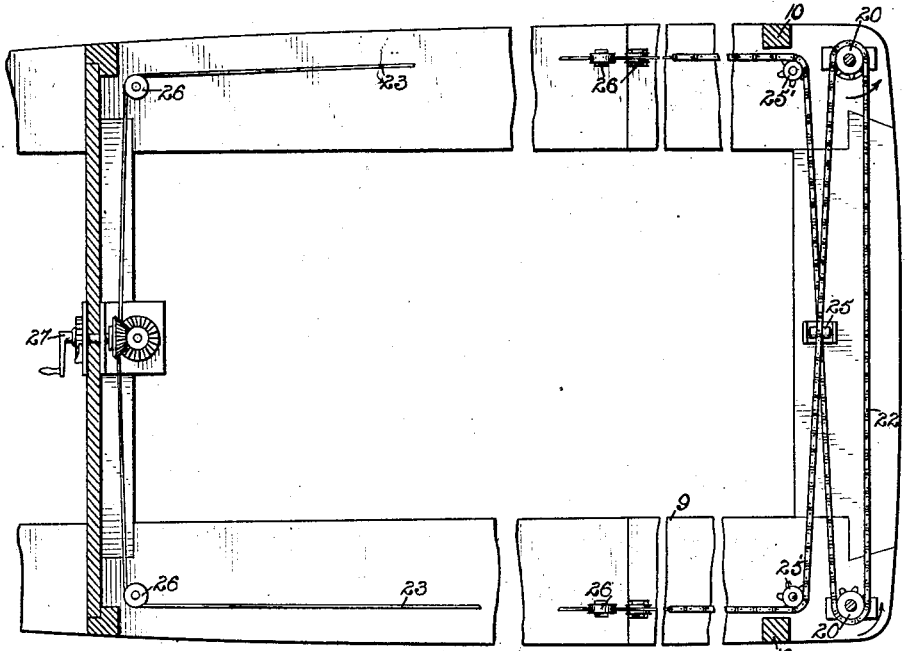
Fig. 4 is a section on line 4—4, Fig. 1.
Figure 5:
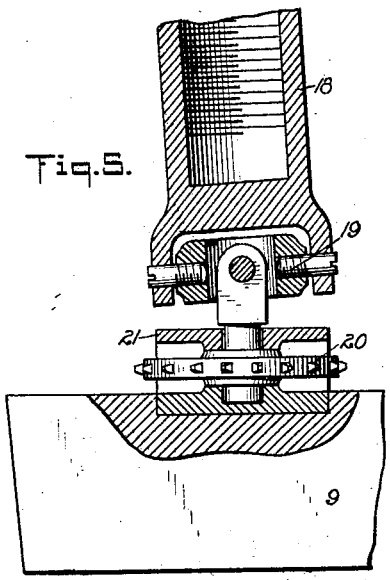
Fig. 5 is an enlarged sectional view on the universal joint connecting the socket to the sprocket.
Figure 6:
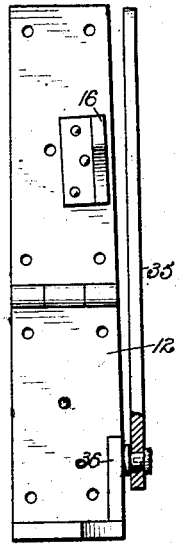
Fig. 6 is an elevation of one of the back hinges.
Figure 8:
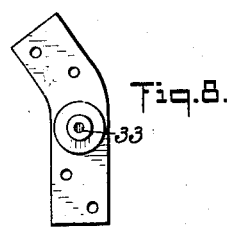
Fig. 8 is an elevation of a bracket carrying the fulcrum of an S-shaped lever.
Figure 7:
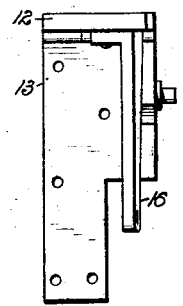
Fig. 7 is a plan view on the said hinge.

The bow 11 has arms 16 preferably formed on the hinges connected to the bow. Each arm is secured by means of a threaded rod 17 to a threaded socket 18. The socket 18 is, in turn, connected by a universal joint 19 to a sprocket 20 rotatably mounted in a suitable bearing 21 secured to the bed 9. The sprockets 20 are engaged by a chain 22 the ends of which chain are connected by flexible members 23 wound on a drum 24 mounted in any suitable place on the vehicle. To actuate the sprockets 20 in the same direction, when the drum is rotated the chain is crossed over a guide roller 25. Suitable guide rollers 25′ and guide pulleys 26 are provided for the chain and flexible members respectively. The drum 24 may be actuated by means of a suitable crank 27, as shown in Figs. 1 and 4, a pawl and ratchet mechanism being provided for maintaining the desired tension on the flexible members. In place of the crank, if desired, the motive power of the engine may be utilized for driving the drum.

Figure 2:
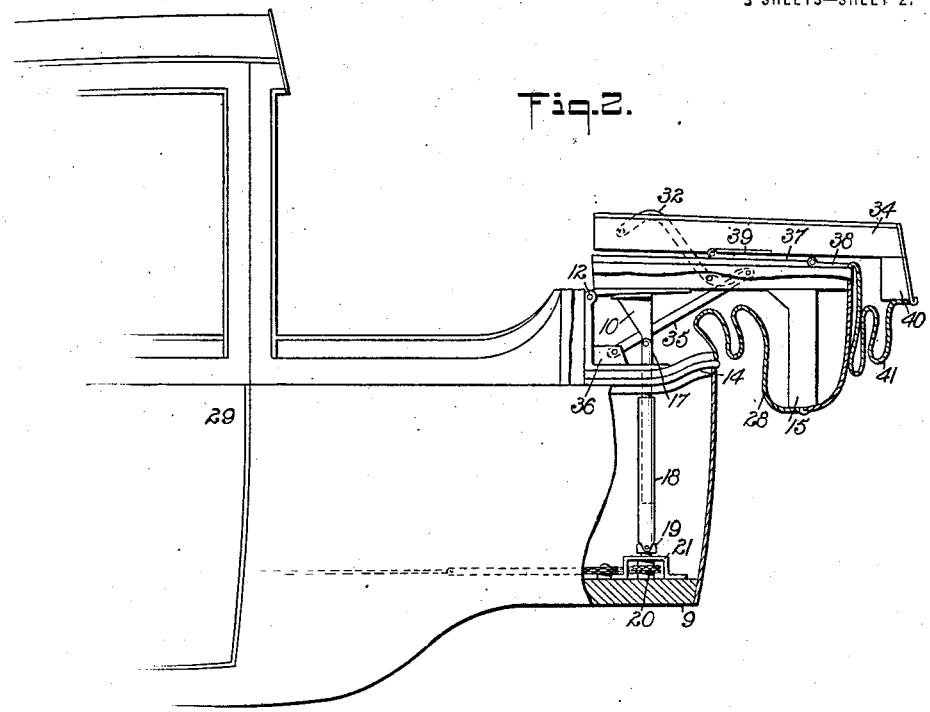
Fig. 2 is a fragmentary elevation of a car showing the top in collapsed position, a certain portion of the car being broken out to show the details of construction.
Figure 3:
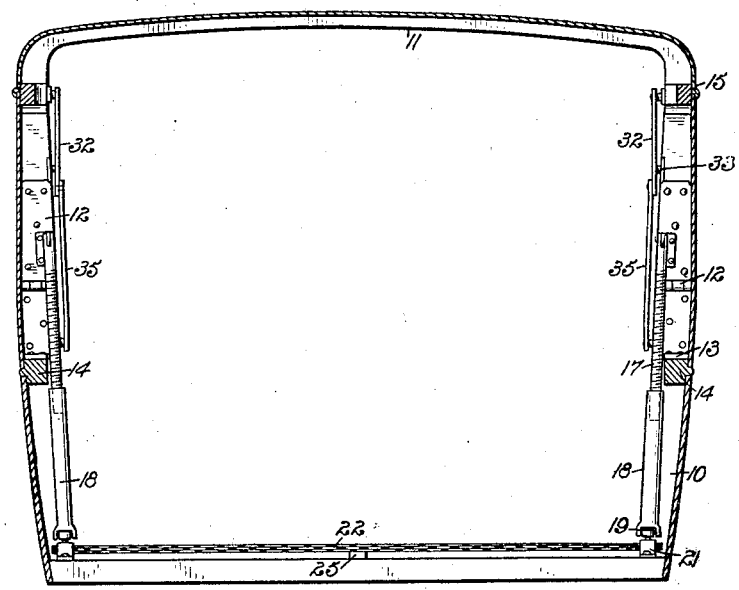
Fig. 3 is a vertical section on line 3—3, Fig. 1.

As the sprockets 20 are rotated by means of the drum in the direction indicated by the arrows in Fig. 4 the threaded rods are drawn into the sockets 18, causing the rear car section formed by the bow 11 and the brace 15 to move rearwardly (see Fig. 2). This displacement of the rear car section requires a wall 28 of flexible material between the braces 14 and 15. The covering between the brace 15 and the upper portion of the bow 11 may be made of any material, flexible or rigid; and the covering between the bed and the brace 14 can also be made of any desired material.

In cases where the doors 29 of the vehicle are not located at the bow 11, but a window 30 is provided thereat, the section 31 of the top above the windows is also made to collapse. To this end the said section is connected by means of levers 32 to the bow 11, so that the fulcrums 33 of said levers are on the sides of the bow. One end of each lever is connected to the adjacent side member 34 of the top section 31. The other end of each lever is connected pivotally by a bar 35 to a stationary part of the vehicle. Preferably a flange 36 is provided on the portion of the hinges 12 which are secured to the rigid uprights 10. The top section 31 is secured to the foldable back portion by double hinges 37. One of the blades 38 of each double hinge is secured to the bow 11. The other plate 39 of each hinge is secured to the corresponding side members 34 of the top section 31. The two side members of the top are reinforced at the free edge by a transverse brace 40.

When the top of the vehicle is folded through the medium of the mechanism described, in its movement it rotates the levers 32 on their fulcrums which are located on the sides of the bow 11. In consequence of which the upright section 34 folds on the double hinge so that the brace 40 of the top section 31 moves upwardly, thereby bringing the middle plate of the double hinge 37 against the sides of the bow 11; and the plates 38 of said hinge are, therefore, brought or folded on to the said metal plate when the top is completely folded, as shown in Fig. 2. The covering 41 for the top section 31 must, therefore, be of flexible material, to permit the movement of the rigid member of said top section as described. To restore the collapsed part of the top to its normal position, the drum is actuated so as to move the threaded rod 17 out of the sockets.

The operating mechanism, that is, the sockets, threaded rods, links and levers, may be located between the walls of the vehicle body, if so desired.

While I have described the principle of operation, together with the device which I now consider to be the best embodiment thereof, I desire to have it understood that the device shown is merely illustrative and that such changes may be made as are within the scope of the appended claims.

I claim:

1. In combination with a vehicle body, a collapsible top comprising a bow hinged to the body at the free ends thereof, a flexible covering between said body and the bow, an arm above the hinged connection of the bow projecting rearwardly of said bow, a pair of relatively movable members in threaded engagement connecting the arm to the body, and means for revolving one of said members whereby said bow is adapted to be swung on its hinge to fold the flexible covering.

2. In combination, a vehicle body, a bow hinged to the body, a flexible covering connected to the body and bow, an arm projecting from the bow, a threaded rod connected to the arm, a threaded socket engaging the rod, means for revolving the socket, and a universal joint coupling the socket to the means for revolving it.

3. In combination, a vehicle body, a bow hinged to the body, a flexible covering connecting the body to the bow, an arm projecting from the bow, a threaded rod connected to the arm, a threaded socket engaging the rod, means for revolving the socket, a universal joint coupling the socket and the means for revolving it, a top section having a flexible cover, a double hinge securing the top section to the bow, a lever fulcrumed on the bow in pivotal engagement with the top section, and a link connecting said lever to the body.

OTTO E. P. FRANZ.

Copies of this patent may be obtained for five cents each, by addressing the "Commissioner of Patents, Washington, D. C."